(12) United States Patent
Wuthnow et al.

(10) Patent No.: US 7,206,611 B2
(45) Date of Patent: Apr. 17, 2007

(54) METHOD FOR DISPLAYING SPECIAL ALERTING ICON

(75) Inventors: Mark Wuthnow, Austin, TX (US); William Rosenberg, Austin, TX (US); Matthew Stafford, Austin, TX (US); Richard M. K. Tam, Austin, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 101 days.

(21) Appl. No.: 11/104,608

(22) Filed: Apr. 13, 2005

(65) Prior Publication Data

US 2006/0234703 A1    Oct. 19, 2006

(51) Int. Cl.
*H04B 1/38* (2006.01)

(52) U.S. Cl. ............... 455/566; 455/418; 455/445; 379/221.14; 379/221.13; 370/351; 370/359

(58) Field of Classification Search ............... 455/566, 455/418, 445; 370/351, 359; 379/221.14, 379/221.13, 219
See application file for complete search history.

(56) References Cited

U.S. PATENT DOCUMENTS

| | | | | |
|---|---|---|---|---|
| 6,128,377 A | * | 10/2000 | Sonnenberg | 379/221.13 |
| 6,134,316 A | * | 10/2000 | Kallioniemi et al. | 379/220.01 |
| 6,694,006 B1 | * | 2/2004 | Klostermann | 379/221.13 |
| 6,937,708 B2 | * | 8/2005 | Hirose | 379/93.12 |
| 2004/0028203 A1 | * | 2/2004 | Wurster et al. | 379/207.02 |
| 2004/0174974 A1 | * | 9/2004 | Meek et al. | 379/210.02 |
| 2004/0213223 A1 | * | 10/2004 | Mori et al. | 370/389 |
| 2006/0268921 A1 | * | 11/2006 | Ekstrom et al. | 370/437 |

* cited by examiner

*Primary Examiner*—Danh Cong Le
(74) *Attorney, Agent, or Firm*—Paul, Hastings, Janofsky & Walker LLP

(57) ABSTRACT

A method used in wireless communications for displaying an icon on a wireless communications device indicating that a calling party is a subscriber of a same wireless communications service provider of a called party. A terminating mobile station switching center (MSC) flags a routing number port associated with a routing number and returns the routing number to an originating MSC when it determines that a request for the routing number is sent from a home locator register (HLR) of the called party's wireless communications service provider and the calling party is also a subscriber of the called party's wireless communications service provider. When receiving an incoming call, the terminating MSC inspects whether the incoming call is to be sent through a flagged routing number port. If so, the terminating MSC generates a SETUP message with an instructions to display the icon. In responsive to the SETUP message, the wireless communications device of the called party displays the icon accordingly, indicating that the calling party is a subscriber of the same wireless communications service provider as the called party.

9 Claims, 10 Drawing Sheets

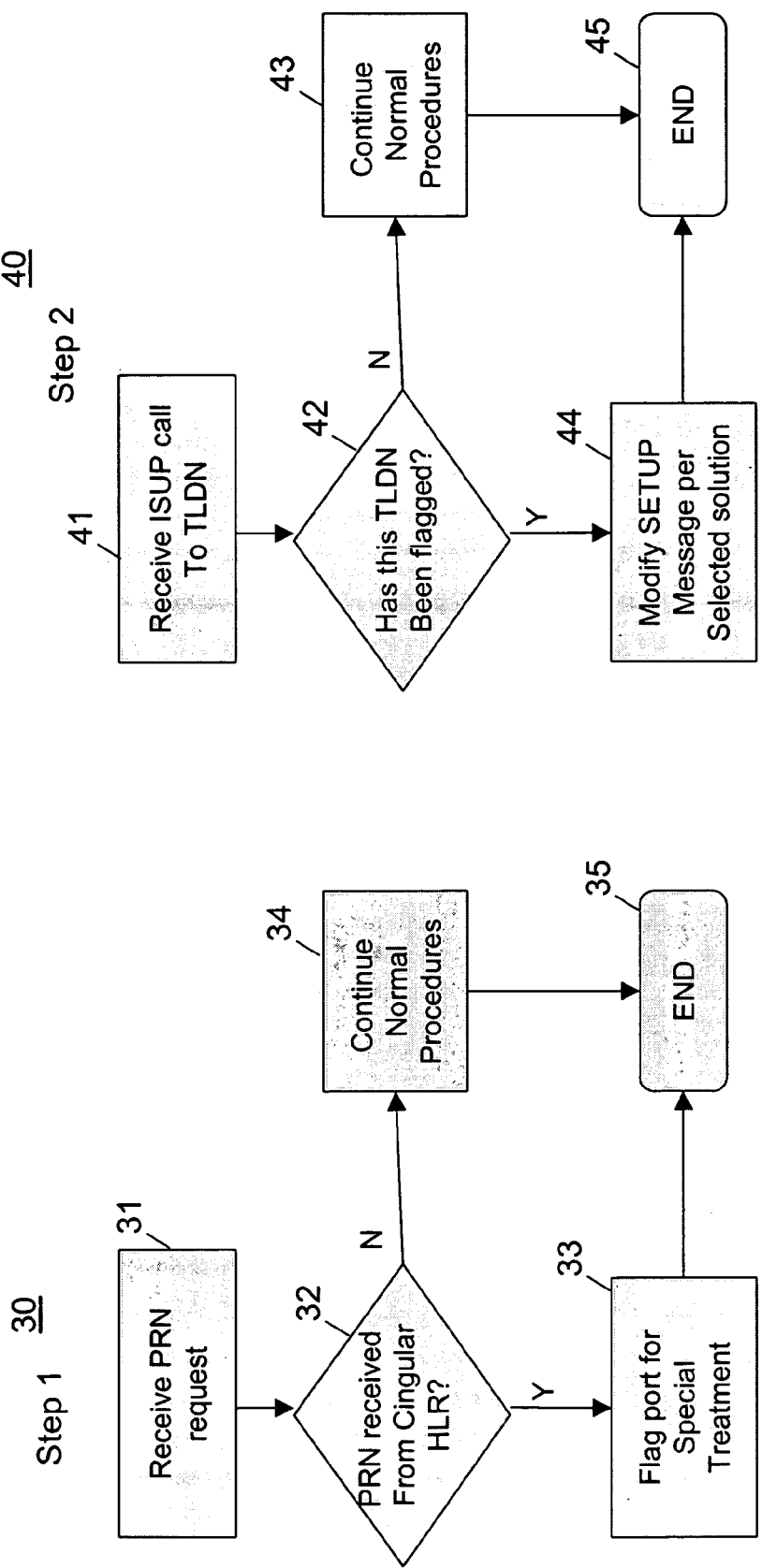

Calling Party Number IE Modification Solution

Calling Party Number SubAddress IE Modification Solution
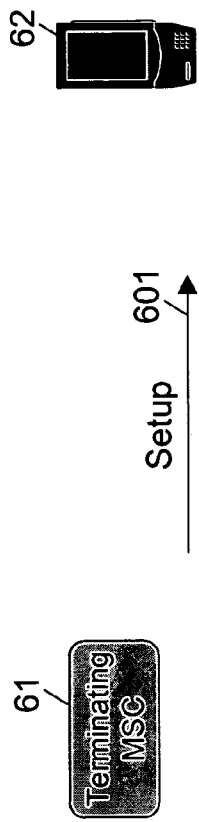
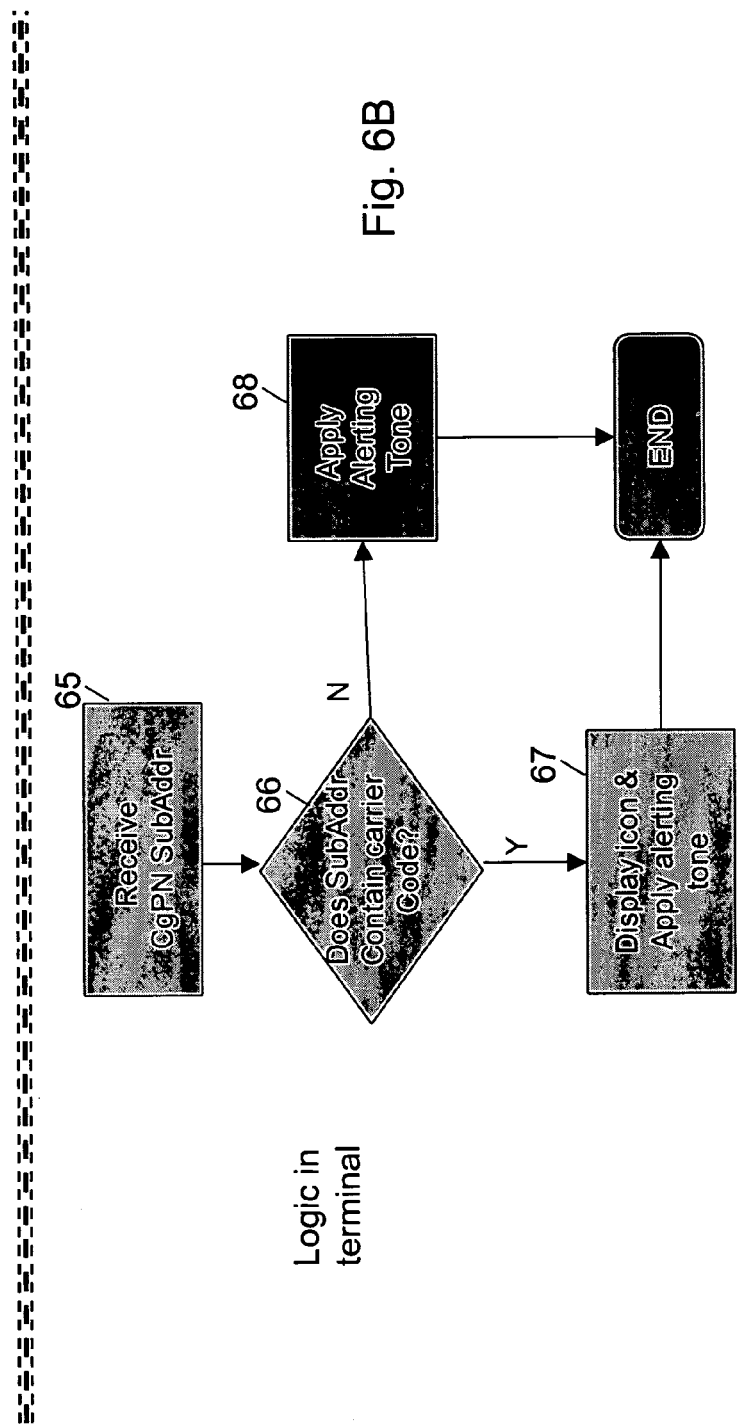
Fig. 6A
Fig. 6B

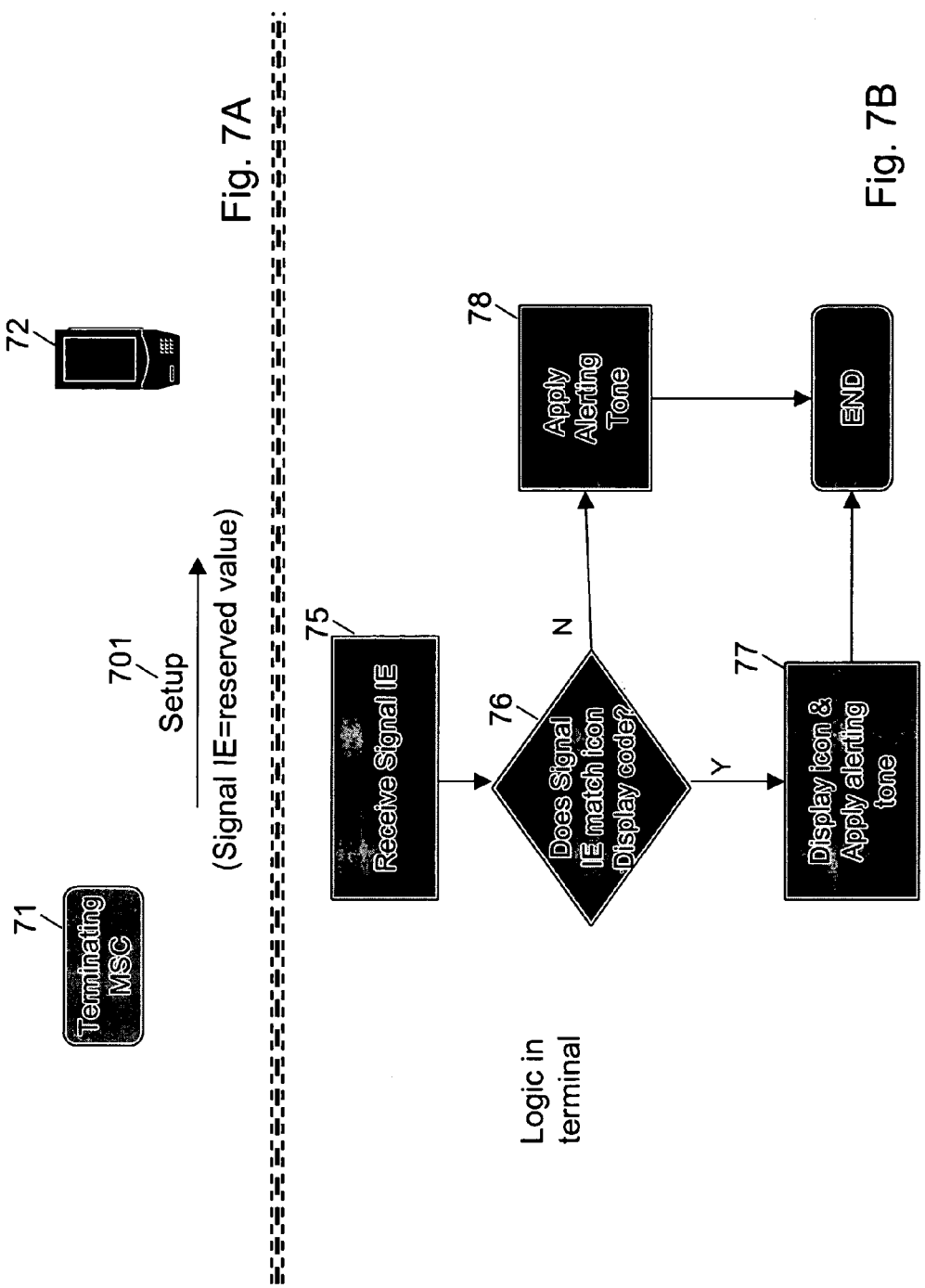

IMS Implementation Solution
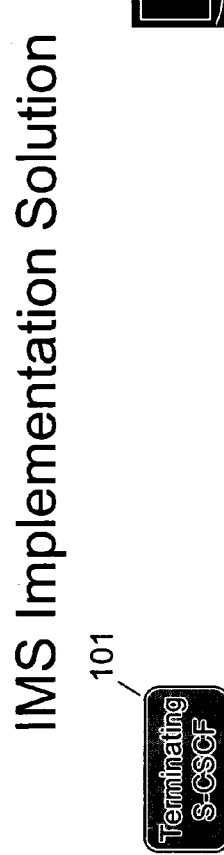
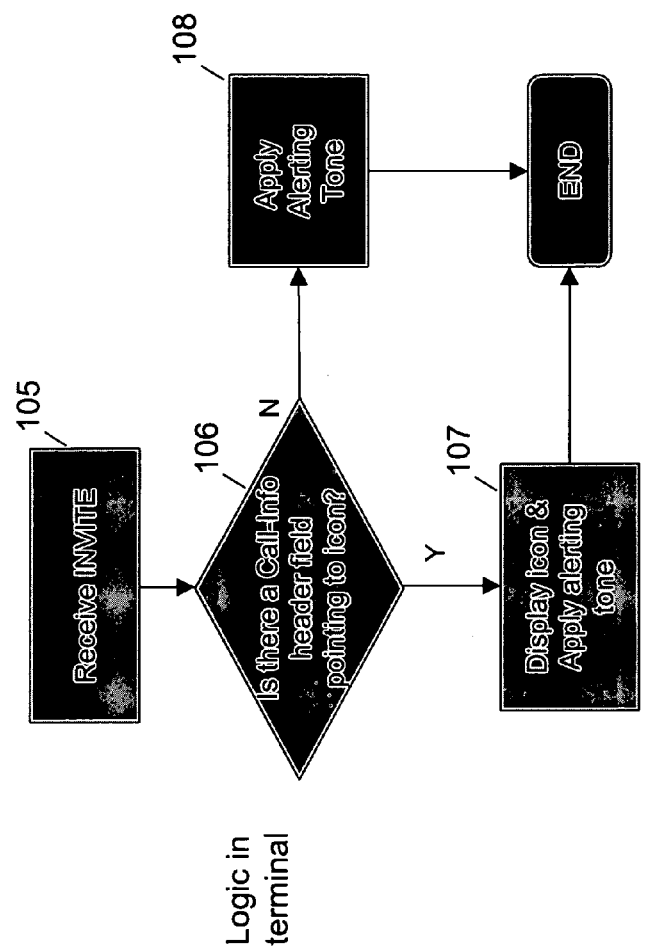
Fig. 10A
Fig. 10B

METHOD FOR DISPLAYING SPECIAL ALERTING ICON

BACKGROUND OF THE INVENTION

1. Field of the Invention

The present invention relates generally to wireless communications methods, and more particularly, to methods for providing an alerting icon on a wireless communications device.

2. Description of Related Art

Wireless communications systems are widely used to receive/send telephone calls via voice channels and/or messages via message channels at remote places for communicating with others. Wireless communications systems operating in accordance with the GSM (Global System for Mobile Communications) standard generally include a plurality of service cells, each of which further includes a plurality of service areas. Within each service cell, there is at least one mobile station switch center (MSC) to communicate with a plurality of wireless communications devices that are located within the service cell. Each wireless communications device is considered a mobile station (MS). All MS profiles are preserved in a home location register ("HLR") that is accessible by the MSC. When a subscriber (i.e., a calling party or a first MS) places a call with a wireless communications device while traveling between different service areas, the call is first transmitted to an originating MSC and then forwarded to a terminating MSC that controls the calls to the called party (i.e., a second MS). In instances where the called party is located in a different service cell, the call may be transmitted to a terminating MSC of a different service cell where the called party is located to transmit the call to the called party.

In the current business environment, wireless communications service providers encounter increasing competition. To enhance competitive capability, the wireless communications service providers rely on technology development to provide their customers with more favorable services. These services include transmitting, by wireless communications devices, text messages, real-time video and audio messages, etc. To attract wireless communications device users, some providers also offer unlimited communications minutes at nights and weekends between users who simultaneously enroll in a service plan.

The offer of unlimited or lower priced communications time between subscribers can increase the number of registered subscribers, thereby increasing revenue. However, presently, when an unknown calling party calls a called party, the called party may not know whether the calling party is also a subscriber of the same wireless communications service provider. Unaware of the status of the calling party, the called party might be inclined to end the call as soon as possible.

SUMMARY OF THE INVENTION

An object of the present invention is to provide a method for displaying an icon to indicate that an incoming call is from a calling party who is also a subscriber of a same wireless communications service provider as a called party. By providing the icon, the called party can effectively take advantage of unlimited minutes or lower communications charges between two subscribers of a same wireless communications service provider.

In accordance with a first embodiment of the present invention, a method for displaying an indication comprises receiving a request of a routing number that is used for transmitting a network message from a calling party to a called party, determining whether the request is sent from equipment that belongs to a specific wireless communications service provider, establishing that the called party is a subscriber of the specific wireless communications service provider if the equipment belongs to the specific wireless communications service provider, and flagging a routing number port associated with the routing number and returning the routing number. It is also then determined whether the calling party is a subscriber of the same wireless communications service provider. If both the called party and the calling party are "co-subscribers", the method then displays an icon on the wireless communications device of the called party when a received network message from the calling party is routed through the flagged routing number port.

In a preferred embodiment, the icon is displayed during an alerting tone cycle.

In accordance with a second embodiment of the present invention, a method for displaying an indication comprises receiving an incoming network message from an originating mobile service switching center (MSC) and checking whether the incoming message is routed via a flagged routing number port. The method generates a first SETUP message to include an instruction command to display an icon if the routing number is flagged, and generates a second SETUP message without including the instruction command if the routing number is not flagged. Afterward, the method transmits the SETUP message to a terminating wireless communications device, and displays the icon by the terminating wireless communications device when receiving the instruction command.

In accordance with a third embodiment of the present invention, a method for displaying an indication comprises receiving a request of a routing number that is used for transmitting a network message from a calling party to a called party, determining whether the request is sent from an equipment that belongs to a specific wireless communications service provider, determining whether the calling party is a subscriber of the specific wireless communications service provider by launching a query to an external database to obtain carrier information of the calling party if the equipment belongs to the specific wireless communications service provider, flagging a routing number port associated with the routing number and returning the routing number if the calling party is a subscriber of the specific wireless communications service provider, and returning the routing number without flagging the routing number port if the calling party is not a subscriber of the specific wireless communications service provider. Upon receiving an incoming network message that is to be routed through the flagged routing number port, the method generates a first SETUP message to include an instruction command to display an icon, transmits the SETUP message to a terminating wireless communications device, and displays the icon on the terminating wireless communications device corresponding to the instruction command included in the SETUP message.

In accordance with a fourth embodiment of the present invention, a method for displaying an indication on a wireless communications device operating in an IP multimedia system (IMS), comprises receiving an invitation message from a calling party to a called party to request a service. The invitation message includes originating carrier information of the calling party. The method determines from the originating carrier information of the calling party whether the calling party subscribes to the same carrier as the called party. If the calling party and the called party subscribe to the same carrier, logic within the called party terminal will display an indication/icon on the wireless communications device of the called party.

BRIEF DESCRIPTION OF THE DRAWINGS

FIGS. 3 and 4 are flow charts showing two stages of a terminating MSC's carrier determination logic in accordance with the present invention.

FIGS. 6A and 6B illustrate a schematic diagram and a flow chart, respectively, of a method for displaying an icon in accordance with another embodiment of present invention.

FIGS. 7A and 7B illustrate a schematic diagram and a flow chart, respectively, of a method for displaying an icon in accordance with a further embodiment of present invention.

FIGS. 10A and 10B illustrate a schematic diagram and a flow chart of a method for displaying an icon in accordance with yet another embodiment of the present invention, respectively.

DETAILED DESCRIPTION OF EXEMPLARY EMBODIMENTS

Methods for displaying an indication to a wireless communications service subscriber that he/she is receiving a call initiated from a service subscriber of the same wireless communications service provider in accordance with the present invention will be explained below. Preferably, the indication takes a form of a special icon (e.g., the "Jack" symbol used by Cingular Wireless, Atlanta, Ga.) appearing on a display of a terminating device during an alerting cycle, such as an alert tone cycle. Generally, the terminating device may include a cellular telephone, a Data Personal Data Assistance (PDA, such as a palm pilot), a computer, a 802.1X device (e.g., WiFi, WiMAX), and similar devices that can transmit and receive voice and messages. (For the purpose of explanation, in the following description, the terminating devices will be described as wireless communications devices.) By providing this information, subscribers will be encouraged to make telephone calls with other co-subscribers, especially if they will enjoy lower cost air-time or free minutes during such calls. In addition, in accordance with a preferred implementation of the present invention, if a subscriber chooses to store a received telephone number in his wireless communications device's address book, the indication can also be added into the address book.

Figure 1:
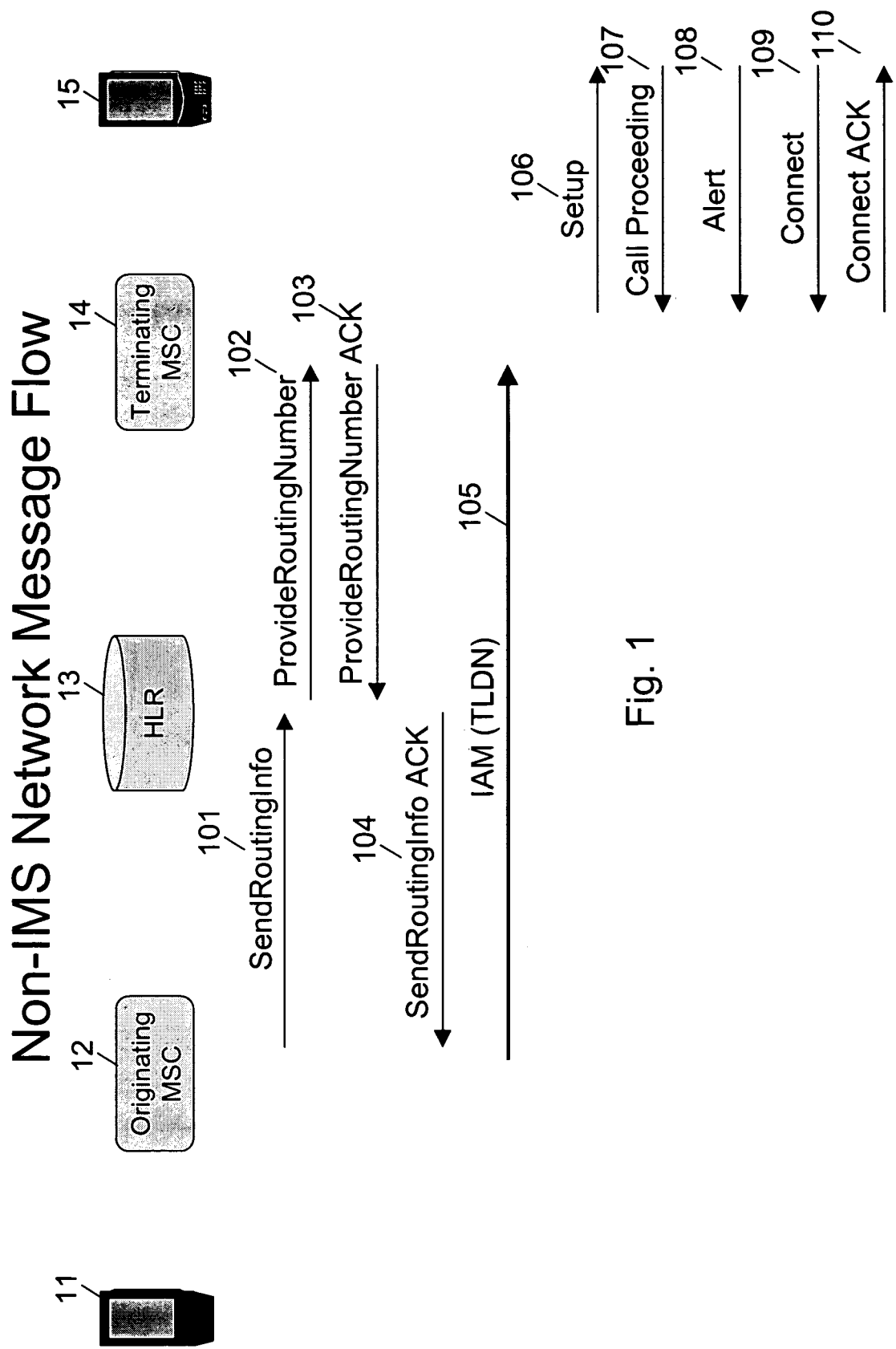
FIG. 1 illustrates a schematic diagram showing conventional call set up in a GSM network.

FIG. 1 illustrates a schematic diagram of calling procedures in a standard GSM network. As shown, originating MSC 12, after receiving an outgoing call from calling party 11, looks for the location of called party 15, and requests routing information from Home Locator Register (HLR) 12 that stores the profile of called party 15. To provide the routing information, HLR 12 sends a ProvideRoutingNumber (PRN) inquiry to terminating MSC 14, represented by arrow 102, to request a temporary routing number for use by originating MSC 12 to deliver the outgoing call to called party 15. Upon receiving the PRN inquiry, terminating MSC 14 transmits the temporary routing number contained in a PRN acknowledge signal (PRN ACK), represented by arrow 103 to HLR 13. Next, as indicated by arrow 104, HLR 13 transmits a send routing information acknowledge signal (SendRoutingInfo ACK) containing the received temporary routing number to originating MSC 12, as indicated by arrow 104. Upon receiving the routing information, originating MSC 12 then connects the outgoing call to terminating MSC 14, as shown by arrow 105, via a voice channel and/or message channel. MSC 14 then generates a SETUP message, as indicated by arrow 106, to display the user name and the telephone number of calling party 11 on a communications device of called party 15 during an alerting cycle. Next, after exchanging signals such as call proceeding 107, alerting 108, connecting 109, and connecting acknowledge 110, called party 15 connects with calling party 15 and the call is completed.

In accordance with the present invention, to provide an indication to a called party 15 that co-subscribers are about to be connected with each other, a serving-MSC, such as terminating MSC 14, needs to be able to first determine that the called party is a subscriber of the wireless communications service provider. This can be accomplished by examining the ProvideRoutingNumber (PRN) request received from a home location register (HLR) requesting a temporary routing number to deliver a voice call. If the HLR belongs to a given wireless communications service provider, then it is known that the called party is a subscriber of that wireless communications service provider. The terminating MSC 14 also needs to determine that the calling party is also a subscriber of the same wireless communications service provider.

Figure 2:
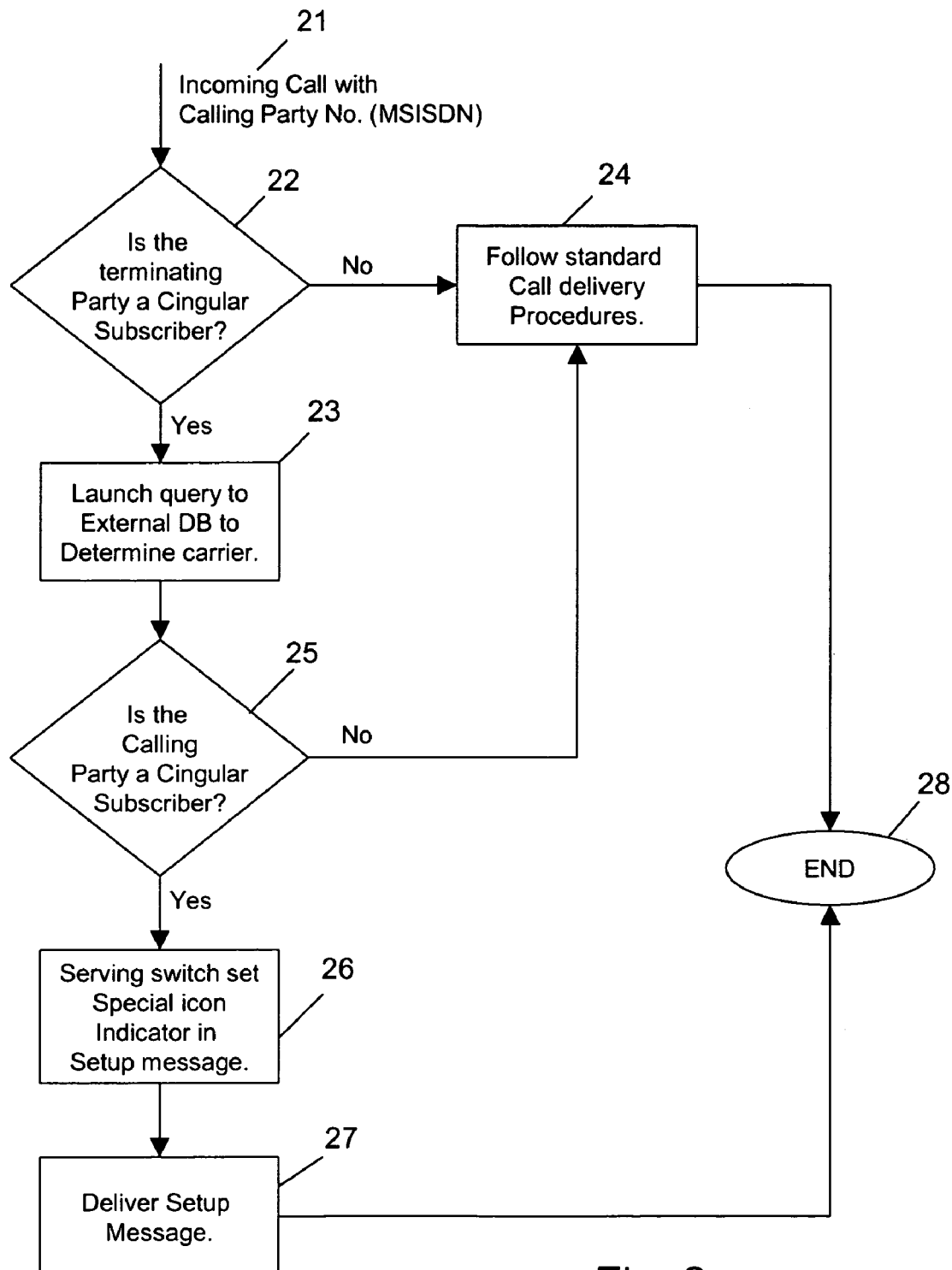
FIG. 2 is a flow chart showing exemplary steps in accordance with the present invention.

FIGS. 2–4 are flow charts showing how, in accordance with the present invention, a terminating MSC determines that the calling party and the called party are co-subscribers and if so, how to indicate this fact to the called party.

FIG. 2 shows a series of exemplary steps in accordance with the present invention. At step 21, an incoming call from a calling party is received by a terminating MSC. At step 22, as described above, the terminating MSC first determines whether or not the called party is a subscriber of a concerned wireless communications service provider by inspecting the ownership of the HLR that requests a PRN. If the HLR that requests the PRN belongs to the concerned wireless communications service provider, then terminating MSC 14 knows that the called party is a subscriber of the concerned wireless communications service provider. If this is the case, the terminating MSC flags a temporary routing number port associated with a temporary routing number that is sent to the HLR, and the process moves to step 23. At this step, the carrier of the calling party is determined by querying an external database that stores carrier information. Preferably, in addition to the carrier information, the external database may also store user names that may be used for caller ID purposes. In another embodiment, the external database only stores the carrier information.

Further, at step 22, if HLR that requests the PRN does not belong to the concerned wireless communications service provider, that is, the called party is not a subscriber of the concerned wireless communications service provider, the incoming call will be terminated using standard call delivery procedures, as shown at step 24, without further determination procedures.

At step 25, the flow determines, from the queried carrier information, whether or not the calling party is also a subscriber of the concerned wireless communications service provider. If not, the terminating MSC 14 unflags the temporary routing number port so that the call will be completed using standard call delivery procedures, as shown at step 24. Otherwise, the flow chart goes to step 26.

At steps 26 and 27, once the terminating MSC recognizes that the calling party is also a subscriber of the wireless communications service provider of the called party, the terminating MSC prepares a SETUP message that contains instructions to display an icon/indication to the wireless communication device of the called party and delivers the SETUP message to the called party. In response to receiving the SETUP message, the wireless communications device of the called party displays the icon/indication indicating that the calling party is also a subscriber of the concerned service provider. Preferably, the special icon/indication may be pre-stored in memory of the wireless communications system to facilitate the display of the special icon in a real-time manner. The process then ends at step 28.

Figure 11:
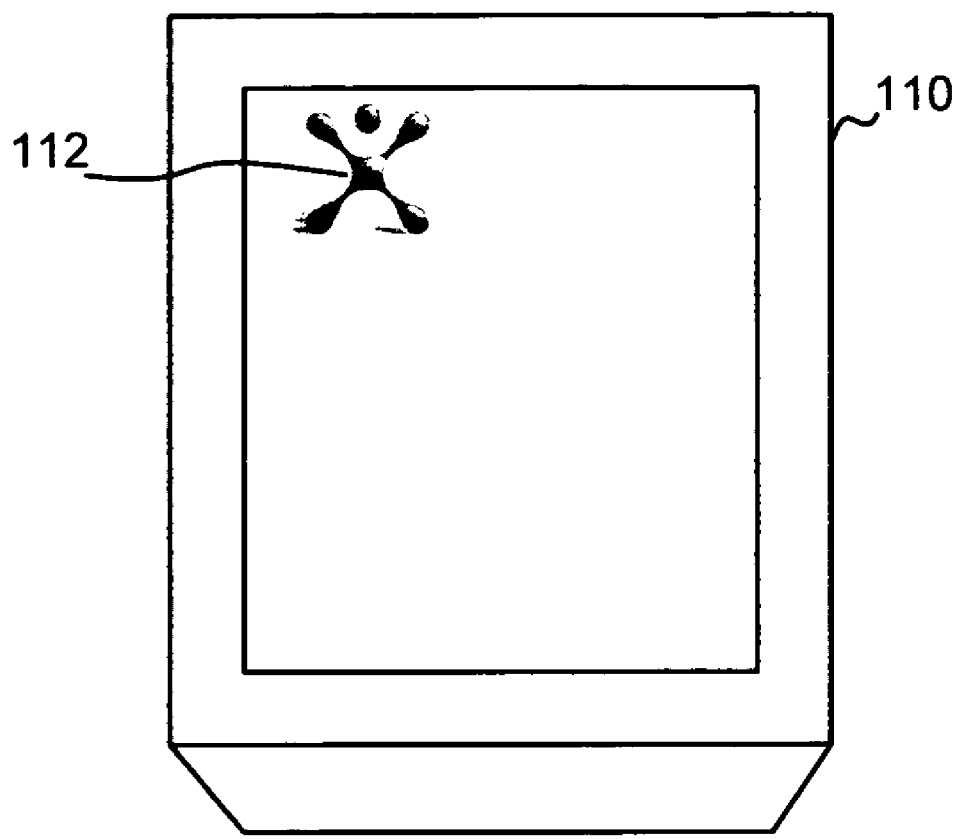
FIG. 11 illustrates that an icon/indication is displayed on a called party's wireless communication device indicating that a calling party and a called party are co-subscribers of a wireless communications service provider.

One exemplary icon/indication is as shown in FIG. 11, wherein wireless communication device 110 of a called party displays indication/icon 112 during an alerting cycle. According to the present invention, the indication/icon 112 can be a symbol of a wireless carrier or a symbol associated with a closed user group.

FIGS. 3 and 4 illustrate a first stage and a second stage of a flow chart for determining the called and calling parties' carriers by a terminated MSC. FIG. 3 is a flow chart for determining the carrier of the called party. In FIG. 3, at steps 31 and 32 of stage 30, when the terminating MSC receives a PRN request from an HLR requiring a temporary routing number, the terminating MSC determines whether the HLR is an HLR of the called party's wireless communications service provider. If not, the terminating MSC returns the temporary routing number to the HLR according to normal procedures, as shown at step 34. Otherwise, the terminating MSC flags the temporary routing number port for special treatment. First stage 30 then ends at step 36.

FIG. 4 is a flow chart for showing what occurs when a received incoming call is being sent from a calling party that is a subscriber of the called party's wireless communications service provider. In FIG. 4, after receiving the temporary routing number for the HLR, an originating MSC sends an ISUP (ISDN user part) message using a TLDN (temporary local domain name) to the terminating MSC. At step 41 of stage 40, the terminating MSC receives the ISUP call. At step 42, the terminating MSC checks whether the TLDN is sent through a flagged temporary routing number port. If not, which means the calling party is not a subscriber of the called party's wireless communications service provider, the terminating MSC connects the call using normal procedures, as shown at step 43. If, however, at step 44, the TLDN is sent through a flagged temporary routing number port, the terminating MSC generates a SETUP message to include an instruction for displaying the icon/indication. Accordingly, when the called party receives the call, the icon/indication is displayed on his/her wireless communications device during a ringing cycle/alerting cycle to indicate to the called party that the calling party is a subscriber of his/her wireless communications service provider. Second stage 40 ends at step 45.

To display the indication icon on a terminating (i.e., called party's) wireless communications device over existing 2G (second-generation) GSM networks, the present invention provides at least four methods. These methods may include: (1) using a new Information Element (IE) exclusive to the wireless communications service provider (e.g., using a locking shifting procedure) to contain the indication information; (2) using leading non-numeric characters in the calling party number IE to contain the indication information; (3) using calling party subaddress IE populated to contain the indication information; and (4) using a new value in signal IE to contain the indication information. Upon receiving and decoding the indication information, the terminating wireless communications device displays the indication icon accordingly. Among these methods, method (1) is considered the cleanest and would avoid future interoperability issues as the Communications Standards evolve because the IE is exclusively used by the wireless communications service provider. Method (2) also works well as long as the wireless communications service provider remains only a world zone 1 carrier or did not want to include this function with any non world zone 1 partner. Method (3) is the next cleanest and would also avoid future interoperability issues. Method (4) would require the wireless communications service provider to use a reserved value in the existing signal IE which would work as long as the Communications Standards do not assign this value to other functions.

FIGS. 5A–7B show schematic diagrams and flow charts to further explain the above methods 2–4 in accordance with the present invention. Since method (1) uses an exclusive IE to deliver the instruction signals of displaying an icon/indication, the process of method (1) is simple and thus the description thereof is omitted here.

Figure 5A:
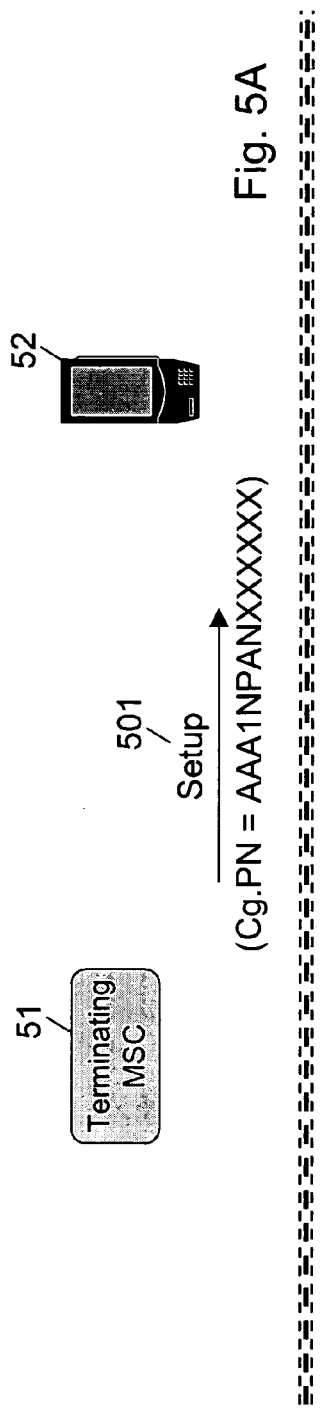
FIGS. 5A and 5B illustrate a schematic diagram and a flow chart, respectively, of a method for displaying an icon in accordance with one embodiment of present invention.
Figure 5B:
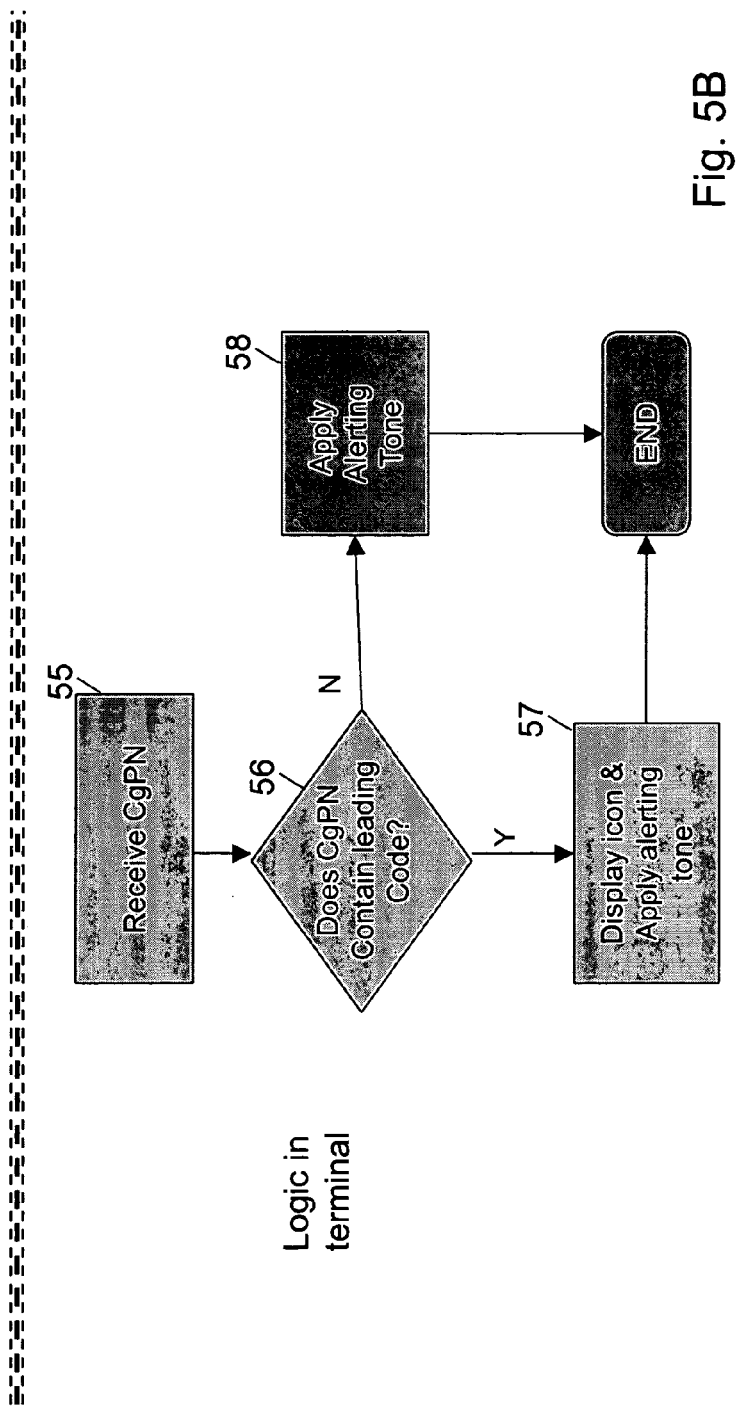

FIGS. 5A and 5B illustrate a schematic diagram and a flow chart of the above method (2). In this method, terminating MSC 51 sets up a message 501 to include an instruction command of the icon/indication as a leading non-numeric code in a calling party IE number CgPN of a SETUP message. The SETUP message is then sent to a wireless communications device 52 of the called party. When wireless communications device 52 receives the SETUP message, at step 55, it checks whether the number CgPN includes the leading code, at step 56. If the CgPN number does not include the leading code, as shown in step 58, the wireless communications device 52 generates an alerting tone in a normal manner. However, if the CgPN number includes the leading code, as shown in step 57, the wireless communications device 52 displays the icon during the alerting tone cycle to indicate to the called party that the calling party is a subscriber of his/her wireless communications service provider.

In method (3) as shown in FIGS. 6A and 6B, terminating MSC 61 includes the instruction of displaying an icon/indication by populating a carrier code in a calling party subaddress (CgPN SubAddr) IE of a SETUP message 601. The SETUP message is then transmitted to wireless communications device 62 of the called party, as shown in FIG. 6A. Upon receiving the SETUP message, the wireless communications device 62 checks whether the CgPN SubAddr in the SETUP message includes the carrier code, at steps 65 and 66. If the CgPN SubAddr does not include the carrier code, wireless communications device 62 generates an alerting tone in a normal procedure, at step 68. Otherwise, at step 67, wireless communications device 62 displays an icon during the alerting tone cycle to indicate the called party that the calling party is a subscriber of his/her wireless communications service provider. By providing the indication, the called party can easily enjoy any special plan offered by the service provider between its subscribers.

FIGS. 7A and 7B illustrate a schematic diagram and a flow chart of the above method (4). In this method, terminating MSC 71 inserts a new value in a signal IE of a SETUP message 701 that instructs wireless communications device 72 to display a special icon. Upon receiving the signal IE, at step 75, the wireless communications device 72 checks whether the signal IE matches with an icon display code, at step 76. If so, device 72 displays icon during an alerting tone cycle, as shown at step 77. Otherwise, device 72 generates the alerting tone cycle in a normal procedure, at step 78.

The above methods are used in a non-IMS network. According to the present invention, once IMS networks are deployed, a fifth method will become available to provide the indication between two parties who both have IMS-capable wireless communications devices.

Figure 8:
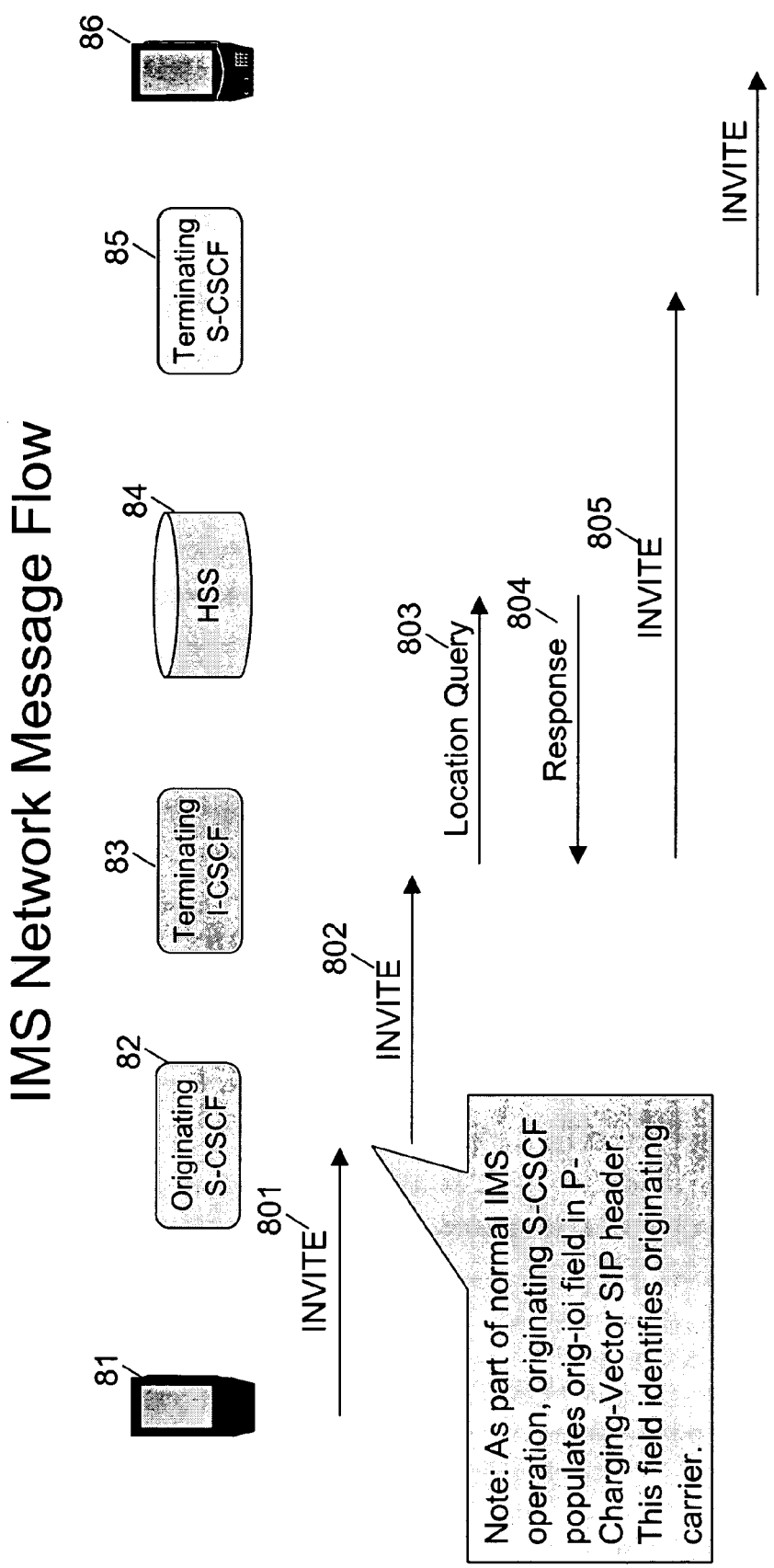
FIG. 8 illustrates a schematic message flow of an IP Multimedia Subsystem (IMS) network in accordance with the present invention.

A schematic message flow of an IMS network is illustrated in FIG. 8. In FIG. 8, calling party 81 sends an INVITE request to called party 86 to invite a service (e.g., a voice call service.) The request is sent by an originating S-CSCF (Serving-call session control function) 82 to terminating I-CSCF 83 (Interrogating-call session control function,) as shown by arrows 801 and 802. As part of a normal IMS operation, originating S-CSCF 82 populates an orig-ioi field in P-Charging-Vector SIP header that identifies an original carrier of the calling party. After receiving the INVITE request, terminating I-CSCF 83 consults a user database of the domain in arrow 803, which is referred to as HSS (home subscriber server) 84 to query the location of called party 86. Once HSS 84 returns a location query to terminating I-CSCF 83 in arrow 804, terminating I-CSCF 83 then sends an INVITE message, in arrow 805, to terminating S-CSCF 85. By inspecting the orig-ioi field of the INVITE message, terminating S-CSCF 85 can determine whether the calling party is a registered user of the same as the called party IMS network.

Figure 9:
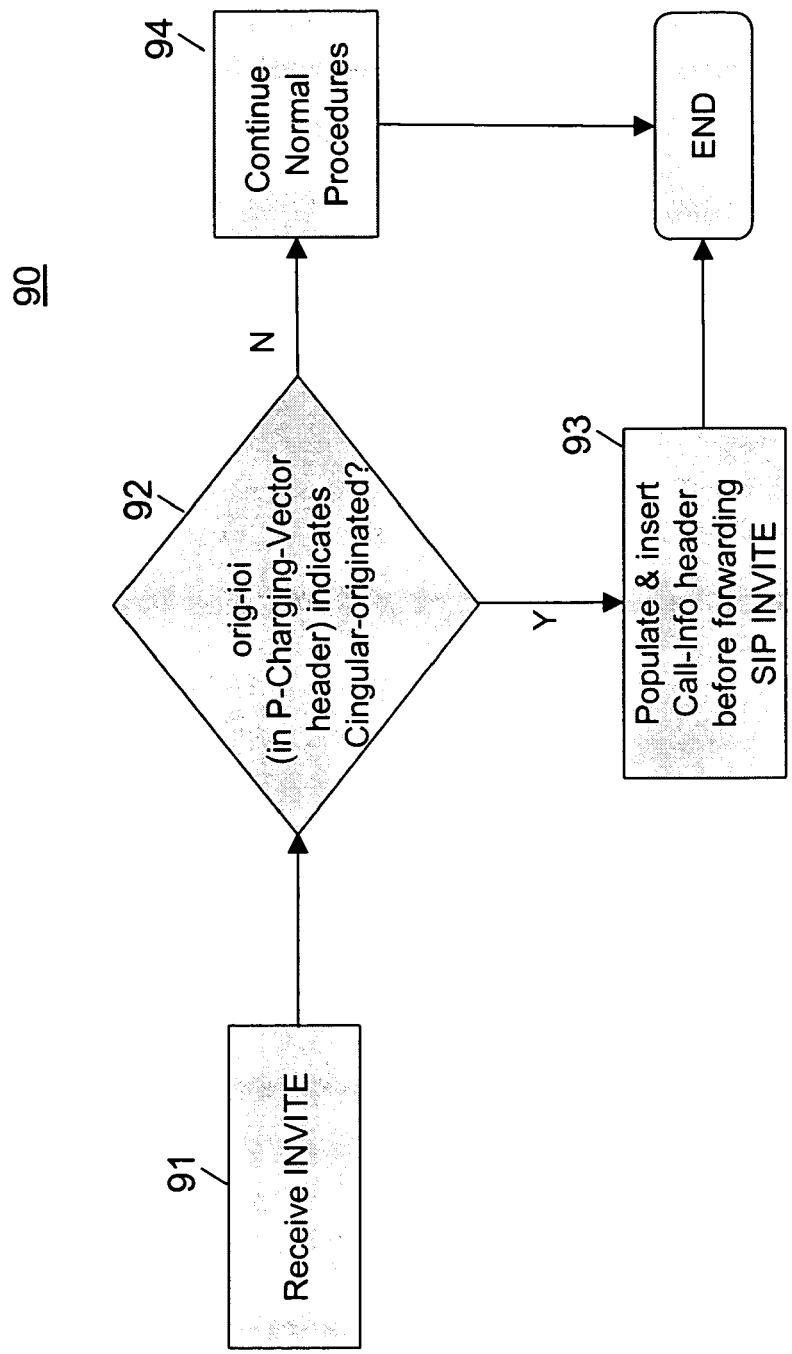
FIG. 9 illustrates a terminating S-CSCF logic flow in an IMS network in accordance with the present invention.

FIG. 9 further illustrates terminating S-CSCF logic flow 90. In FIG. 9, upon receiving the INVITE message at step 91, the terminating S-CSCF checks whether the orig-ioi in the P-Charging-Vector header of the INVITE message indicates that the calling party is a subscriber of a specific IMS network at step 92. If so, the terminating S-CSCF populates and inserts a Call-Info header in the INVITE message and sends the inserted INVITE message to a wireless communications device of the called party, as shown at step 93. Otherwise, the terminating S-CSCF handles the INVITE message according to normal IMS procedures.

FIGS. 10A and 10B show how the terminating S-CSCF inserts an instruction of displaying an icon to the inserted INVITE message when it recognizes that the INVITE message is coming from a registered calling party. As shown in FIG. 10A, terminating S-CSCF 101 populates the Call-Info header in the INVITE message 1001 before sending it out to wireless communications device 102 of the called party. Therefore, in FIG. 10B, when wireless communications device 102 receives the INVITE message at step 105, it checks whether the Call-Info header of the message indicates a display of an icon at step 106. If so, device 102 displays the icon during an alerting tone cycle, as shown at step 107. Otherwise, device 102 generates the standard alerting tone cycle in normal IMS procedures.

Preferably, if both of the wireless communications devices of the calling and called parties are IMS capable, there is no need for serving switch involvement. The calling party's device (e.g, a PDA, user equipment (UE), and so on) can send in its originating message the special icon or a link to the special icon (such as the Call-Info field). This would be transported across the network and would be delivered to the called party's device. The called party's device then displays the special icon along with playing the alerting tone.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for displaying an indication, comprising:
   receiving a request of a routing number that is used for transmitting a network message from a calling party to a called party;
   determining whether the request is sent from an equipment that belongs to a specific wireless communications service provider;
   establishing that the called party is a subscriber of the specific wireless communications service provider if the equipment belongs to the specific wireless communications service provider;
   flagging a routing number port associated with the routing number if the calling party is a subscriber of the specific wireless communications service provider and returning the routing number; and
   displaying an icon on a wireless communications device of the called party when the routing number port is flagged to indicate that the calling party is a subscriber of the specific wireless communications service provider.

2. The method of claim 1, wherein the equipment requesting the routing number is a home location register (HLR).

3. The method of claim 1, further comprising launching a query to an external database to obtain a carrier information of the calling party to determine the calling party's wireless communications service provider.

4. The method of claim 1, further comprising storing a telephone number of the calling party with the icon in an address book of the wireless communications device.

5. The method of claim 1, wherein the icon is displayed during an alerting tone cycle.

6. The method of claim 1, wherein the wireless communications device includes one of a Personal Database Assistant (PDA), a cellular telephone, a computer, and a 802.1X device.

7. The method for displaying an indication, comprising:
receiving a request for a routing number that is used for transmitting a network message from a calling party to a called party;
determining whether the request is sent from an equipment that belongs to a specific wireless communications service provider;
determining whether the calling party is a subscriber of the specific wireless communications service provider by launching a query to an external database to obtain carrier information of the calling party if the equipment belongs to the specific wireless communications service provider;
flagging a routing number port associated with the routing number and returning the routing number if the calling party is a subscriber of the specific wireless communications service provider;
returning the routing number without flagging the routing number port if the originating equipment does not belong to the specific wireless communications service provider;
receiving an incoming network message that is to be routed through the flagged routing number port;
generating a SETUP message to include an instruction command to display an icon;
transmitting the SETUP message to a terminating wireless communications device; and
displaying the icon on the terminating wireless communications device corresponding to the instruction command included in the SETUP message.

8. The method of claim 7, further comprising when receiving an incoming network message that is not routed through a flagged routing number port, generating a different SETUP message without the instruction of displaying the icon.

9. The method of claim 7, wherein the equipment is an HLR.

* * * * *